(12) United States Patent
Newman et al.

(10) Patent No.: US 11,898,655 B2
(45) Date of Patent: Feb. 13, 2024

(54) TANK VALVE SYSTEM WITH COMBINED OVERFILL PREVENTION AND FUEL LEVEL INDICATION

(71) Applicant: YSN Imports, LLC, Pico Rivera, CA (US)

(72) Inventors: Shmuel Dovid Newman, Los Angeles, CA (US); Chin-Cheng Chang, Taichung (TW)

(73) Assignee: YSN Imports, LLC, Pico Rivera, CA (US)

( * ) Notice: Subject to any disclaimer, the term of this patent is extended or adjusted under 35 U.S.C. 154(b) by 0 days.

(21) Appl. No.: 17/871,524

(22) Filed: Jul. 22, 2022

(65) Prior Publication Data

US 2023/0026267 A1 Jan. 26, 2023

Related U.S. Application Data

(60) Provisional application No. 63/224,826, filed on Jul. 22, 2021.

(51) Int. Cl.
*F16K 31/26* (2006.01)
*G01F 23/34* (2006.01)
*F17C 13/04* (2006.01)

(52) U.S. Cl.
CPC .............. *F16K 31/26* (2013.01); *F17C 13/04* (2013.01); *G01F 23/34* (2013.01); *F16K 2200/50* (2021.08); *F17C 2201/0109* (2013.01); *F17C 2201/058* (2013.01); *F17C 2205/0332* (2013.01); *F17C 2221/035* (2013.01); *F17C 2250/0413* (2013.01); *F17C 2250/0491* (2013.01); *F17C 2260/022* (2013.01)

(58) Field of Classification Search
CPC . F17C 2250/0413; F16K 31/26; F16K 31/265
See application file for complete search history.

(56) References Cited

U.S. PATENT DOCUMENTS

| 6,138,709 | A | 10/2000 | Home |
| 7,040,343 | B2* | 5/2006 | Tseng ............... F16K 31/265 |
| | | | 137/430 |
| 7,219,686 | B2 | 5/2007 | Schmitz et al. |
| 7,726,334 | B2 | 6/2010 | Ross, Jr. et al. |
| 8,550,111 | B2* | 10/2013 | Home ................ F17C 13/04 |
| | | | 73/317 |

(Continued)

*Primary Examiner* — Paul J Gray
(74) *Attorney, Agent, or Firm* — Lance M. Pritikin

(57) ABSTRACT

A tank valve system comprises a main valve body, an overfill protection device (OPD), a gauge drive apparatus and a fuel level indicator. The OPD and gauge drive apparatus are configured to both be inserted through a narrow neck of a fuel storage tank prior to connecting the valve body to the neck. The valve body includes a primary fuel channel and a shuttle interface channel. The OPD includes an overfill float driving an overfill shutoff valve for controlling fluid flow from the primary channel into the tank. The gauge drive apparatus includes a gauge float, a shuttle, and an elongated extension body. The gauge float is movable with respect to the extension body between an uppermost position and a lowermost position, thereby driving the shuttle. The shuttle has a gauge actuation portion transportable within the shuttle interface channel to thereby actuate the fuel level indicator.

23 Claims, 13 Drawing Sheets

(56) References Cited

U.S. PATENT DOCUMENTS

2008/0078467 A1    4/2008  Home
2016/0199614 A1*   7/2016  Donnelly ............ A61M 16/168
                                                    128/203.25

* cited by examiner

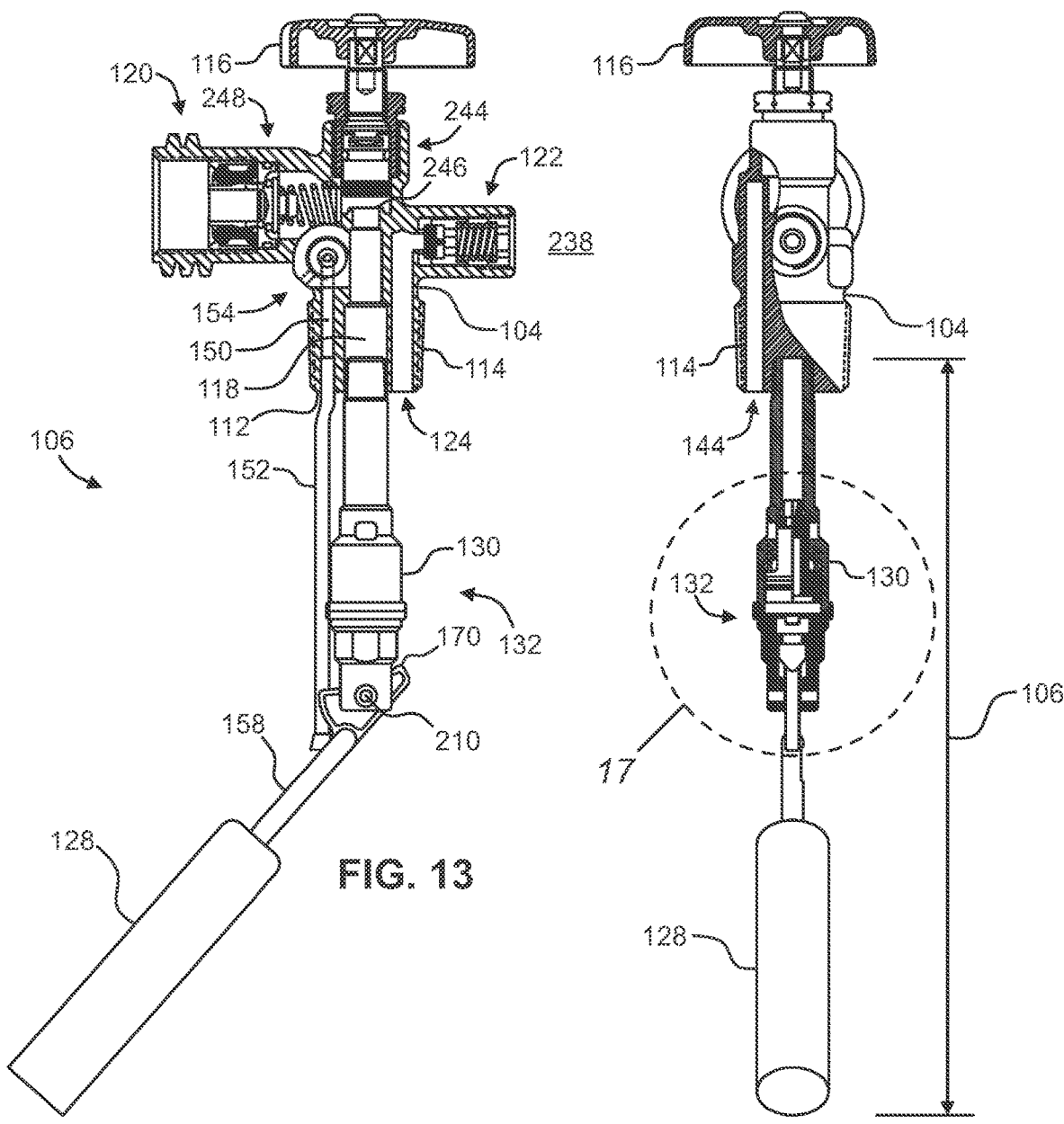
FIG. 13
FIG. 14
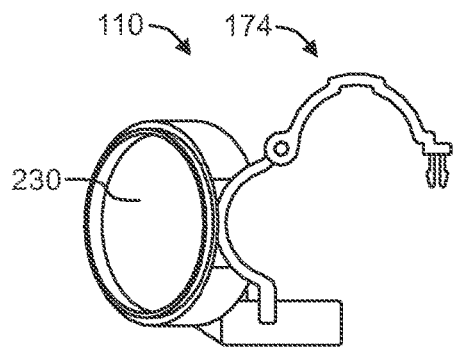
FIG. 15
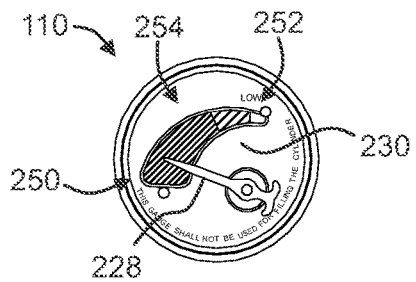
FIG. 16

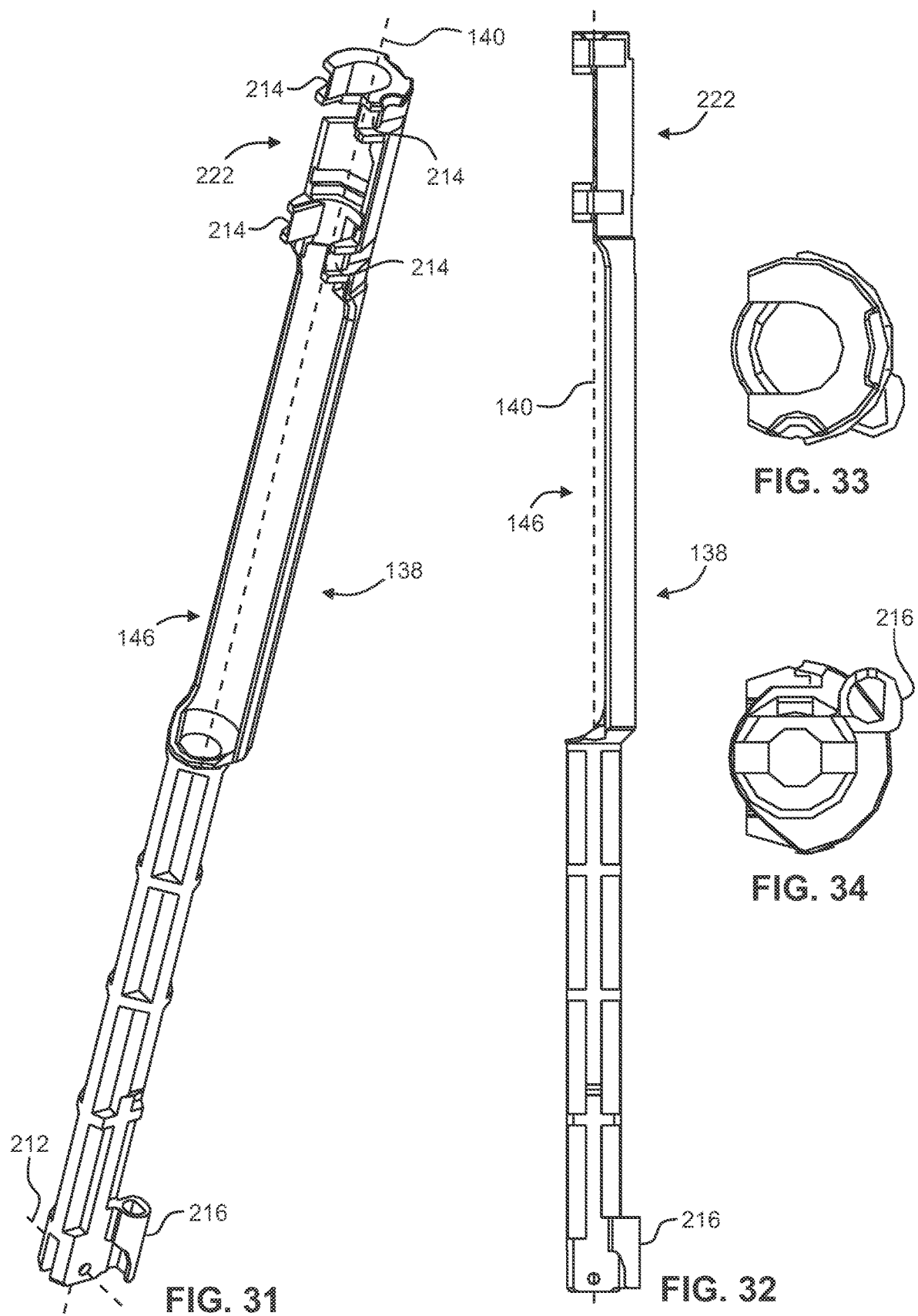

*PRIOR ART*

TANK VALVE SYSTEM WITH COMBINED OVERFILL PREVENTION AND FUEL LEVEL INDICATION

This application claims the benefit of U.S. Provisional Application No. 63/224,826 filed Jul. 22, 2021, the content of which is incorporated by this reference in its entirety for all purposes as if fully set forth herein.

TECHNICAL FIELD

The disclosure herein relates generally to systems and methods for preventing the overfilling of a fuel tank and indicating the fuel level within the tank.

BACKGROUND

The technical field needs improved tank valve systems with combined overfill prevention and fuel level indication mechanisms, particularly wherein those systems are configured to facilitate insertion of the overfill prevention and fuel level indication sensors into the respective tank.

SUMMARY

Certain deficiencies of the prior are overcome by tank valve systems with combined overfill prevention and fuel level indication constructed, implemented and operated in accordance with the present disclosure.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 13 is a partial cross-sectional view illustrating an overfill prevention device (OPD) mated to the primary fuel channel of a main valve body;

FIG. 14 is a partial cross-sectional view taken orthogonally to that of FIG. 13;

FIG. 15 is a diagrammatic perspective view of one example fuel level indicator affixable to a main valve body;

FIG. 16 is a diagrammatic front view of one example fuel level indicator, showing an example indicator needle and indicator face;

FIG. 31 is a diagrammatic perspective view of one example of an extension body;

FIG. 32 is a diagrammatic side view of the extension body of FIG. 31;

FIG. 33 is a diagrammatic top view of the extension body of FIG. 31;

FIG. 34 is a diagrammatic bottom view of the extension body of FIG. 31;

DETAILED DESCRIPTION OF THE PREFERRED EMBODIMENTS

Figure 1:
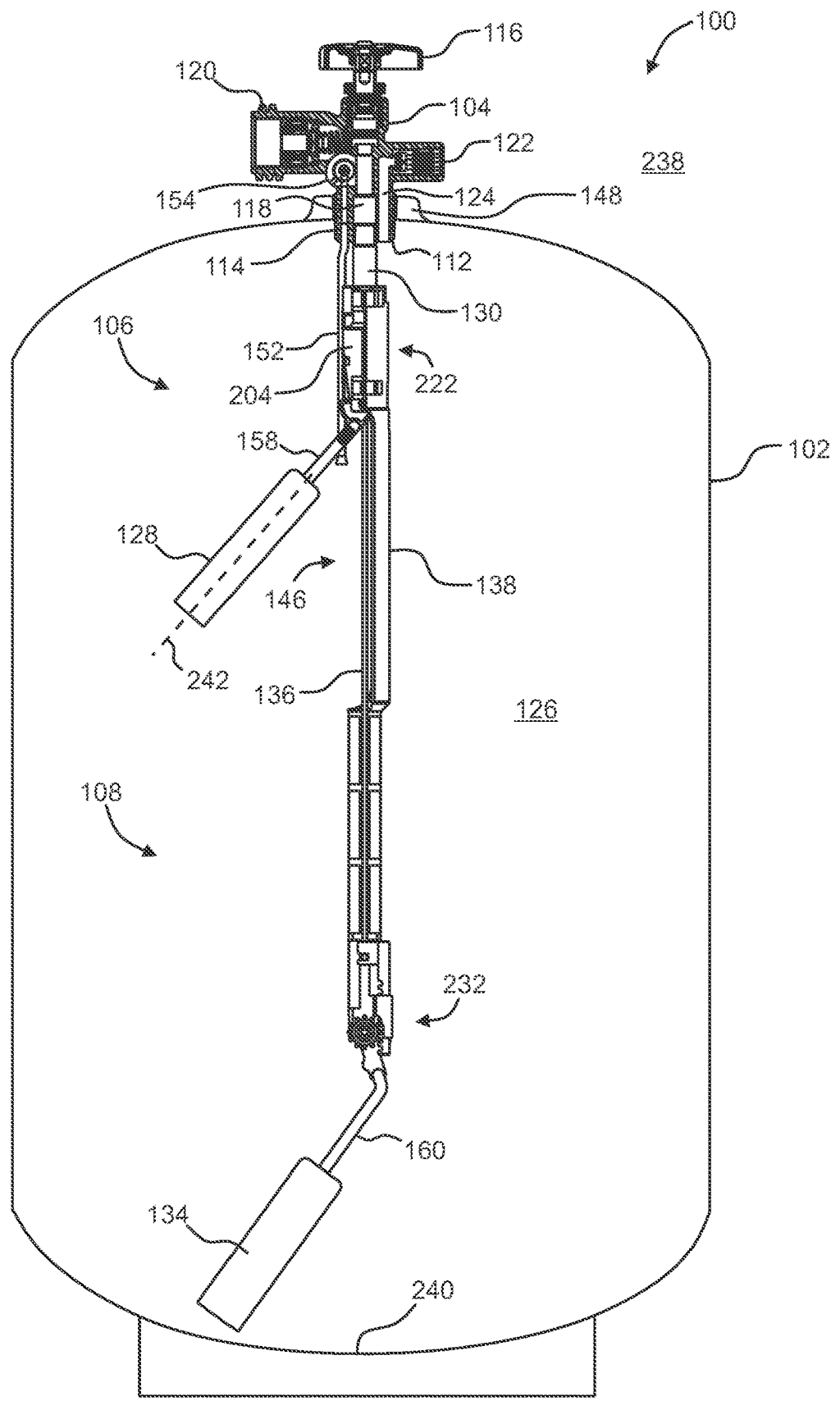
FIG. 1 is a diagrammatic partial cross-sectional view of one example tank valve system, wherein the tank valve system is shown installed within a fuel storage tank devoid of liquid fuel.

Referring now to the drawings, like reference numerals designate identical or corresponding features throughout the several views.

Figure 46:
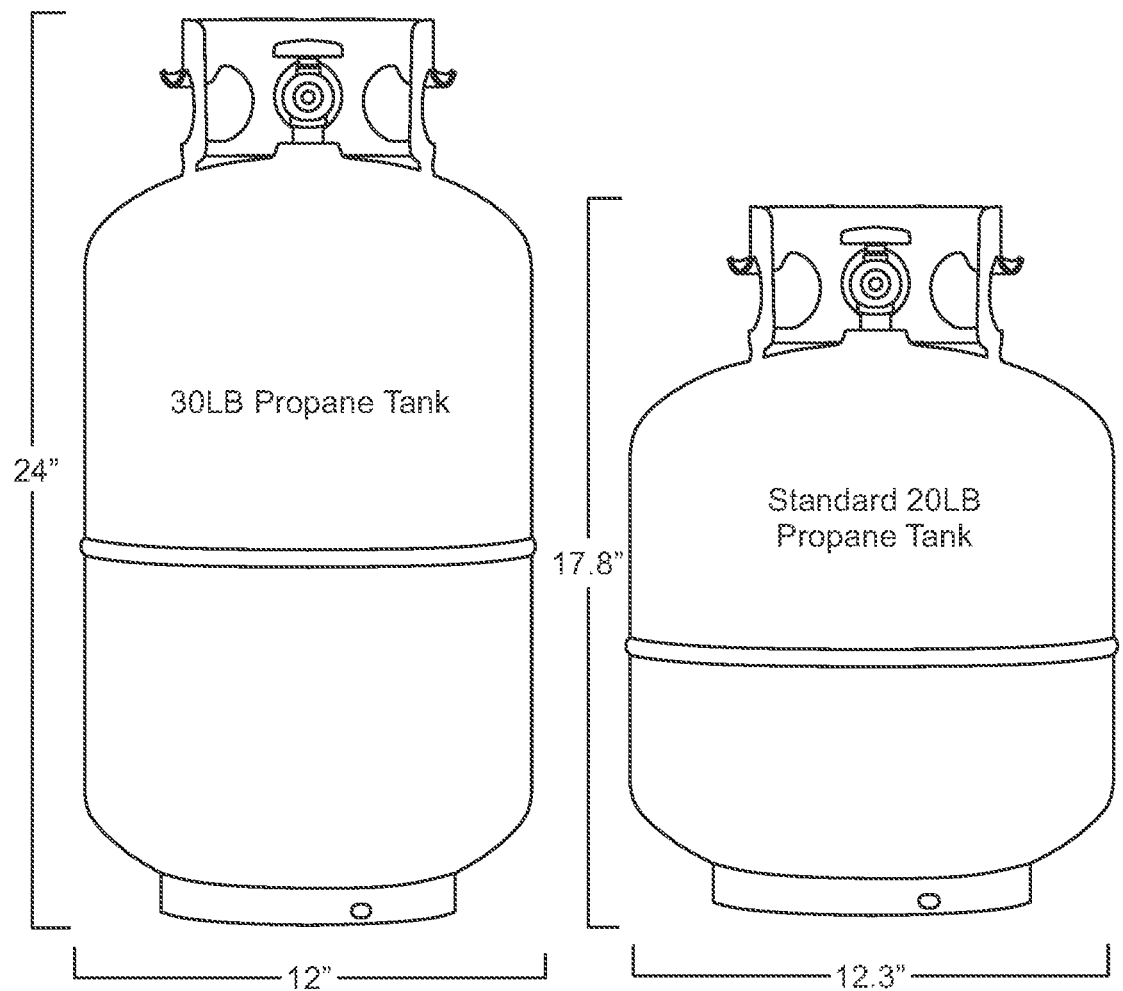
FIG. 46 shows two examples of conventional propane tanks.

With reference to the several drawings, embodiments of a tank valve system are shown generally at 100, and may be employed with or comprise a corresponding fuel storage tank 102 configured to receive, store and dispense fuels such as propane. For example, the fuel storage tank 102 may be a 30-pound propane tank similar the one shown in FIG. 46.

Figure 2:
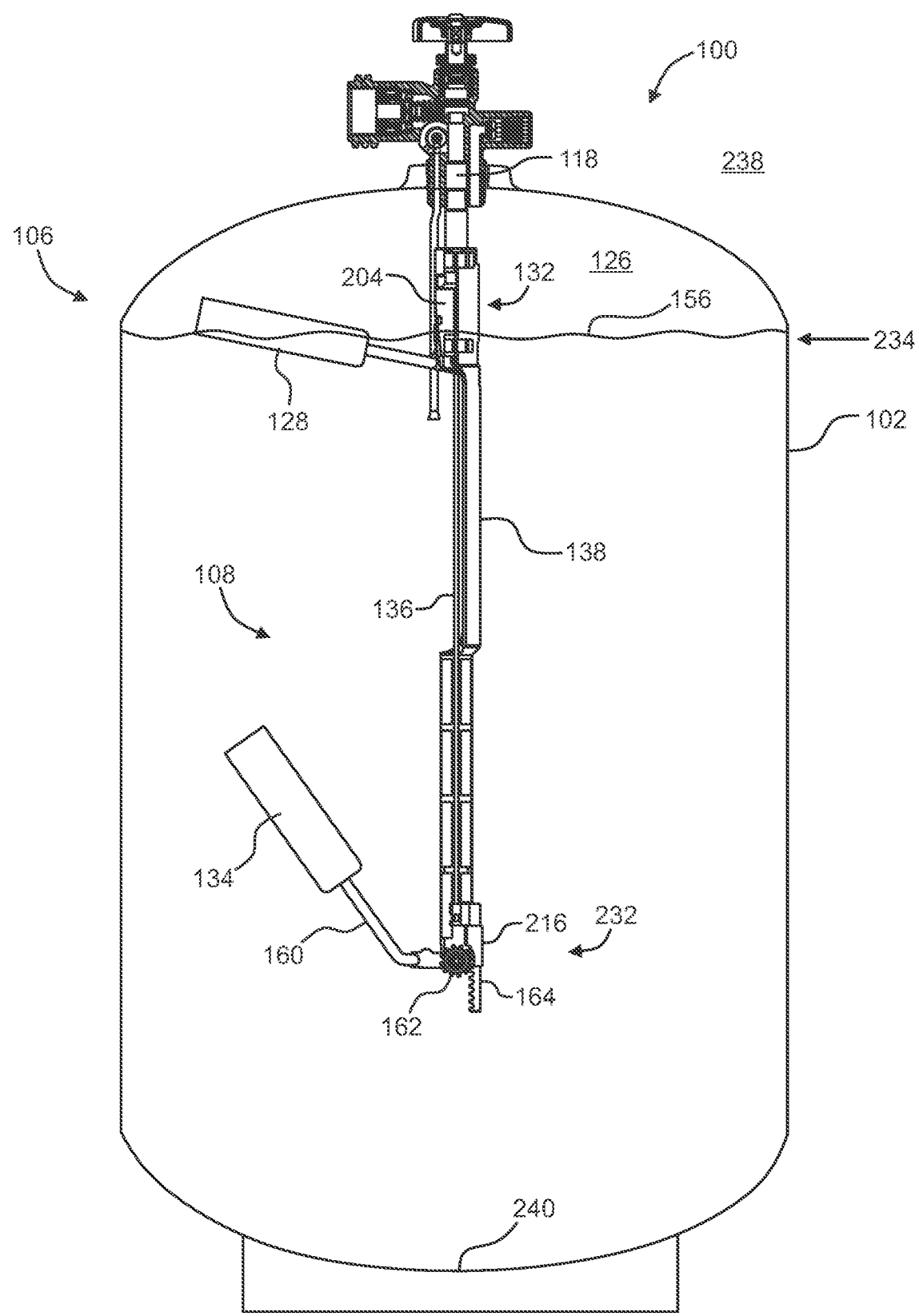
FIG. 2 is a diagrammatic partial cross-sectional view similar to FIG. 1, but wherein liquid fuel level within the fuel chamber is shown at a maximum allowable fuel level.
Figure 3:
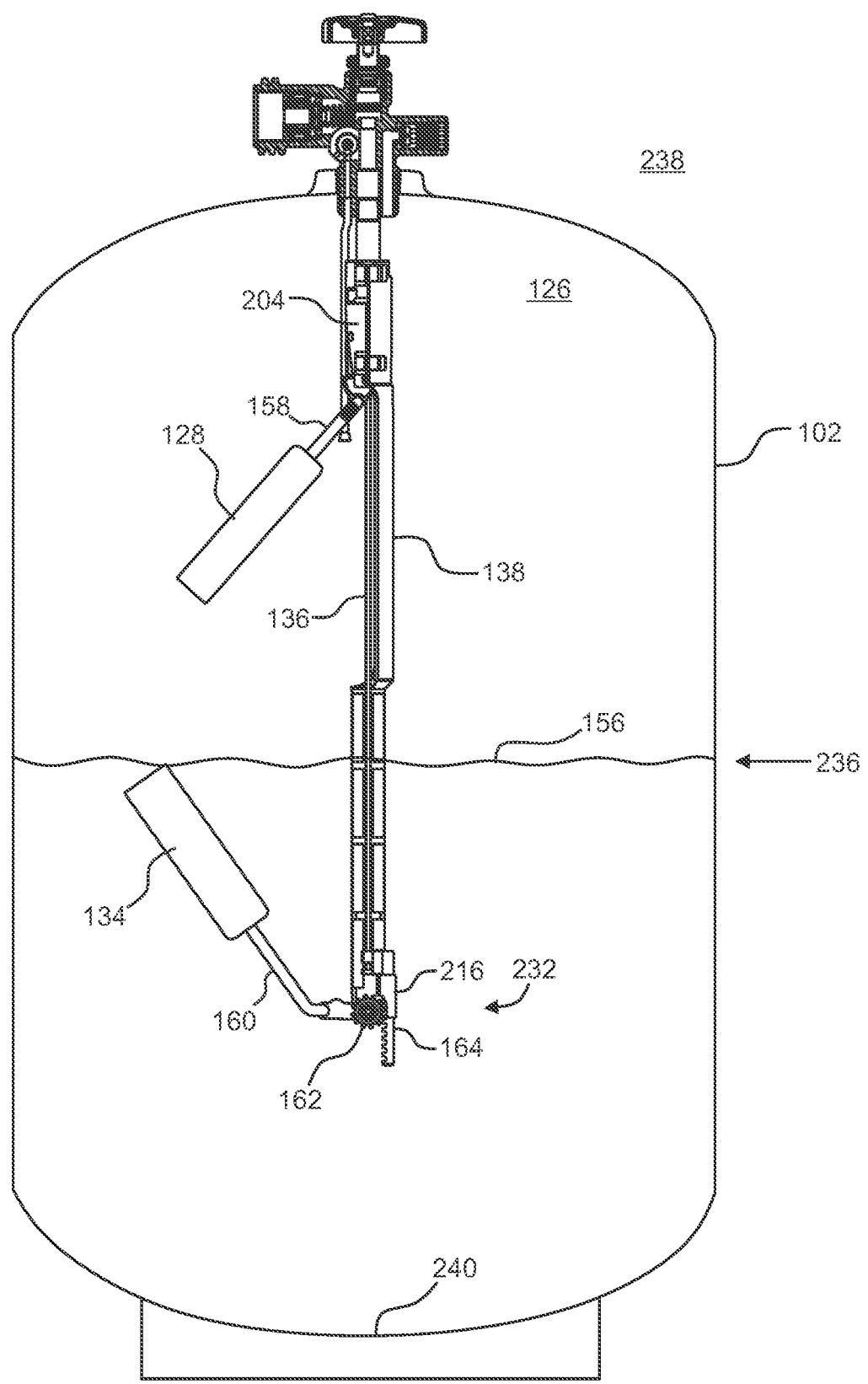
FIG. 3 is a diagrammatic partial cross-sectional view similar to FIG. 2, but wherein liquid fuel level within the fuel chamber is shown at a maximum gauge influence level.

Referring to FIGS. 2 and 3, the tank valve system 100 is preferably configured to provide overfill protection in combination with a progressive indication of the liquid fuel level 156 in the lower portion of the fuel storage tank 102. Moreover, referring to FIGS. 4 and 5, certain preferred aspects of the tank valve system 100 facilitate the installation and removal of the overfill prevention and gauge drive portions of the system 100 through a tank neck 148 having a narrow inner diameter. For example, the neck 148 may be configured in accordance with ¾-inch NPT standard. Alternatively, or in addition, the neck 148 may have an inner diameter of 1.05 inches.

Referring to FIG. 1, a tank valve system 100 may comprise a main valve body 104, an overfill protection device (OPD) 106, a gauge valve apparatus 108, and a fuel level indicator 110.

Referring to FIGS. 13 and 14, the main valve body 104 may have a proximal end 112, a tank engagement portion 114, and an outlet connection portion 120. The main valve body 104 may be connectable to a neck 148 of a fuel storage tank 102 to thereby retain the proximal end 112 in fluid communication with a fuel chamber 126 within the fuel storage tank 102. For example, the tank engagement portion 114 may be configured to threadedly engage a neck 148 of the fuel storage tank 102, similarly to conventional propane tank valve systems. The main valve body 104 may include a primary fuel channel 118 and a shuttle interface channel 144 extending, for example, inwardly from the proximal end 112.

The main valve body 114 may further include a pressure relief channel 124 extending, for example, inwardly from the proximal end 112. A pressure relief valve 122 may be disposed within the main valve body 114 between the pressure relief channel 124 and the ambient environment 238 external to the main valve body 104 and fuel storage tank 102. The pressure relief valve 122 may be configured to relieve excess pressure from within the fuel chamber 126 to the ambient environment 238.

The outlet connection portion 120 may be configured to connect to a fitting, such as a conventional fuel connection adaptor associated with a fuel source or a fuel-using device. Examples of fuel using devices include conventional propane heaters or barbeque grills. Preferably, the outlet connection portion 120 may be configured in accordance with a standard QCC connection for propane valves.

A handwheel 116 is preferably provided, and is typically disposed oppositely of the proximal end 112. The handwheel allows a user to manually open and close a main valve 244 disposed in fluid communication between the primary fuel channel 118 and the outlet connection portion 120. A connection safety valve 248 is preferably disposed in fluid communication between the outlet connection portion and the main valve 244, and is configured to be forced open against a spring bias when the appropriate adaptor is properly connected to the outlet connection portion 120.

The main valve body 104 may preferably include a bleed channel 150 disposed in fluid communication between the proximal end 112 and a bleed port 154. The bleed port preferably has a bleed screw (or the like) thereat, which allows a user to expose the bleed channel to the ambient environment 238 while filling the fuel storage tank 102. The bleed channel 150 is preferably configured to receive and retain a dip tube 152, which itself is configured to extend partially into the fuel chamber 126 to allow liquid fuel to expel from the bleed port 154 into the ambient environment 238 once the liquid fuel level reaches or exceeds a maximum safe limit during the filling operation.

Figure 44:
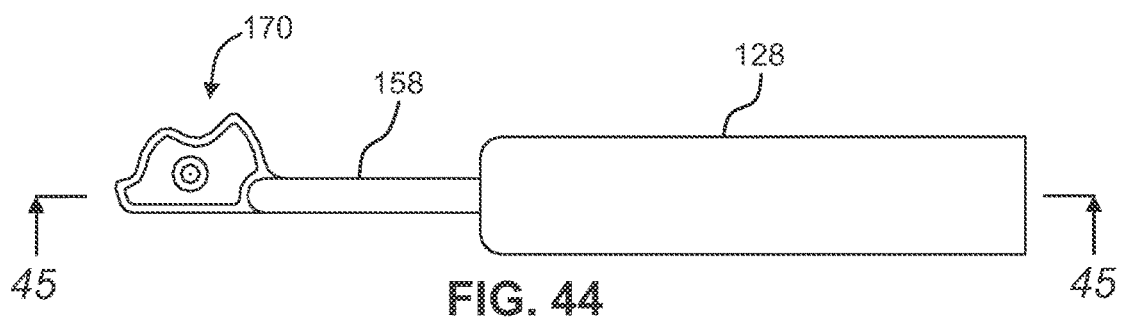
FIG. 44 is a diagrammatic side view of an example overfill float element with associated overfill float arm and cam portion.
Figure 45:
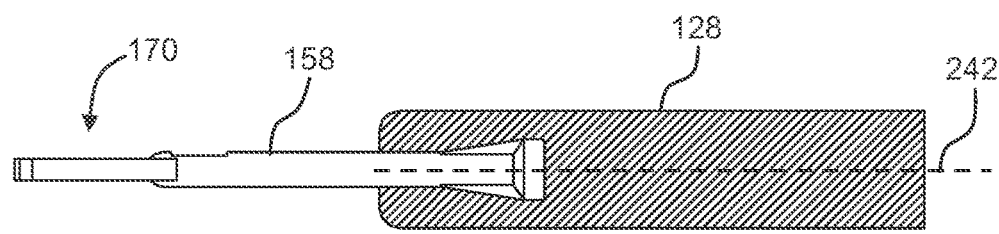
FIG. 45 is a diagrammatic cross-sectional view taken along lines 44-44 in FIG. 44.

Referring to FIGS. 1, 13 and 14, an overfill protection device (OPD) 106 may include an overfill float element 128, and an overfill shutoff valve 132 housed within and overfill protection valve body 130. The OPD may be configured to mate to the primary fuel channel 118 to thereby position the overfill shutoff valve 132 in fluid communication between the primary fuel channel 118 and the fuel chamber 126. The overfill float element 128 may be movable between a release position (shown, for example, in FIG. 1) and a shutoff position (shown, for example, in FIG. 2). Referring to FIGS. 44 and 45, the overfill float element 128 may preferably include an associated overfill float arm 158 and cam portion 170.

Figure 9:
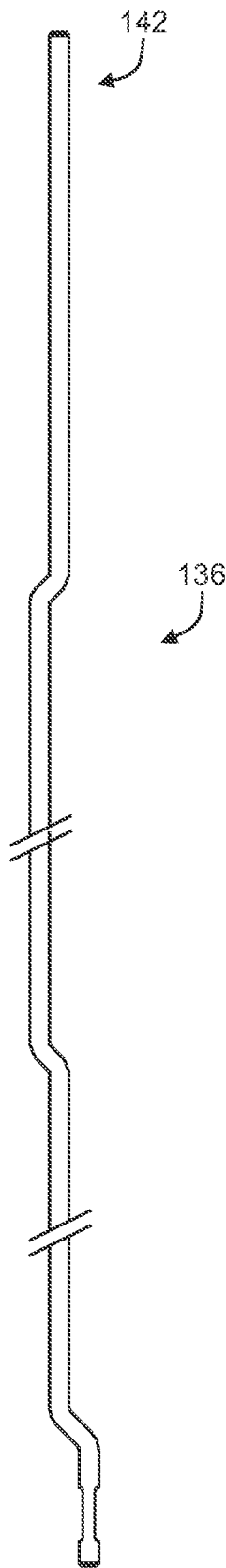
FIG. 9 is a diagrammatic side view of a shuttle element.
Figure 10:
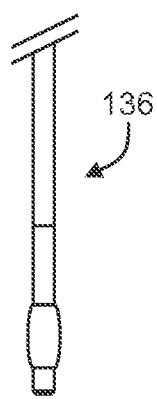
FIG. 10 is a diagrammatic side view illustrating a lower portion of the shuttle element of FIG. 9, with a rack fastener element affixed thereto.

Referring to FIG. 1, a gauge drive apparatus 108 may include a gauge float element 134, a shuttle element 136, and an extension body 138. Referring to FIG. 31, the extension body 138 may be elongated along an extension axis 140. The gauge float element 134 may be movable with respect to the extension body 138 between an uppermost position (shown, for example, in FIGS. 2 and 3) and a lowermost position (shown, for example, in FIG. 1). Referring to FIG. 9, the shuttle element 136 may have a gauge actuation portion 142 transportable within the shuttle interface channel 144 between a top position (see, for example, in FIG. 11) and a bottom position (see, for example, in FIG. 12).

Referring to FIG. 1, the OPD 106 and the gauge drive apparatus 108 are configured to be within the fuel chamber 126 when the main valve body 104 is connected to the fuel storage tank 102. The overfill float element 128 and the gauge float element 134 are configured to be buoyant in a liquid fuel.

Figure 11:
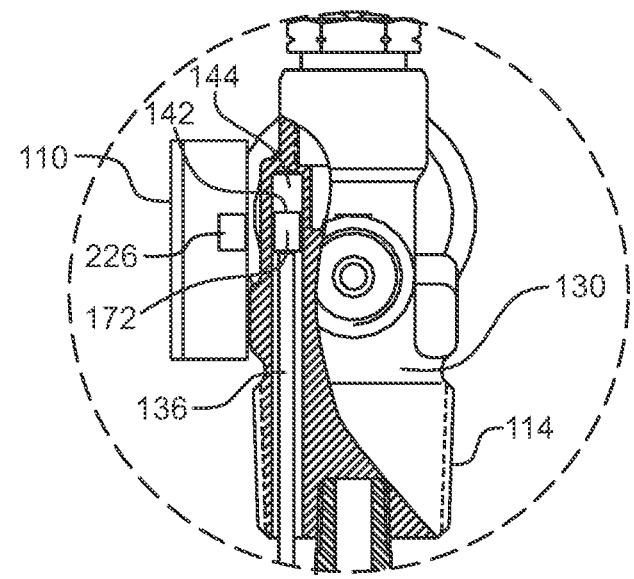
FIG. 11 is a magnified view of detail 11 in FIG. 6, showing the gauge actuation portion at a top position within the shuttle interface channel.
Figure 12:
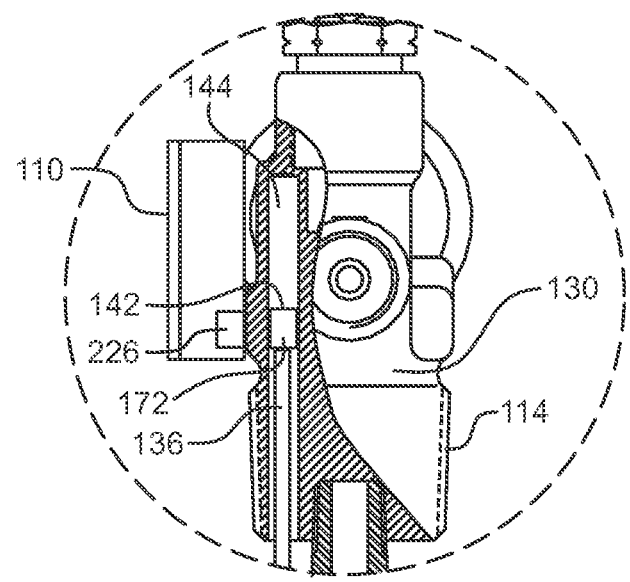
FIG. 12 is a magnified view similar to that of FIG. 11, but showing the gauge actuation portion at a bottom position within the shuttle interface channel.

Referring to FIG. 16, the fuel level indicator 110 may be configured to indicate a high fuel level 250, a low fuel level 252, and intermediate fuel levels 254 therebetween. These indications may be, for example, by way of positioning of an indicator needle 228 or the like along an indicator face 230. Referring to FIGS. 11, 12 and 15, the fuel level indicator 110 may preferably be affixable (e.g., by an indicator clamp element 174) to the main valve body 104 and configured to magnetically communicate with the gauge actuation portion 142.

Figure 17:
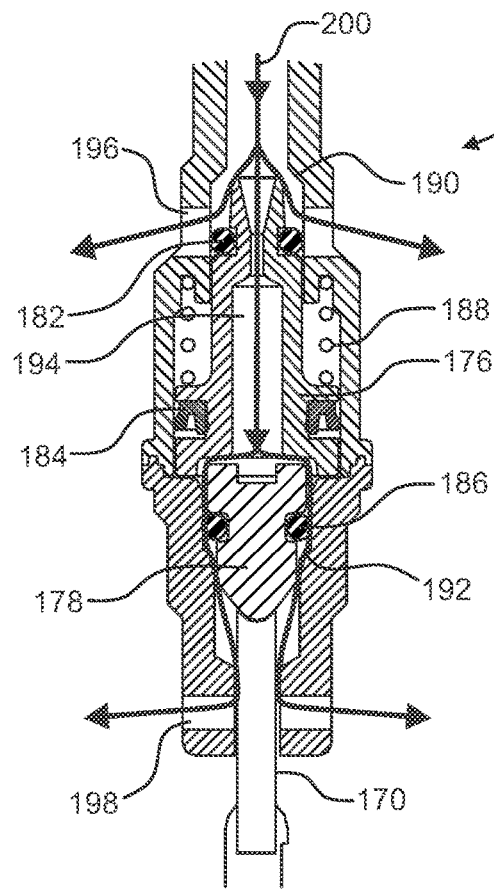
FIG. 17 is a magnified cross-sectional view of detail 17 in FIG. 14, showing an example overfill shutoff valve wherein the valve plug is being upwardly retained as a result of overfill float element being out of the shutoff position, thereby allowing the fuel storage tank to receive incoming fuel flow.
Figure 18:
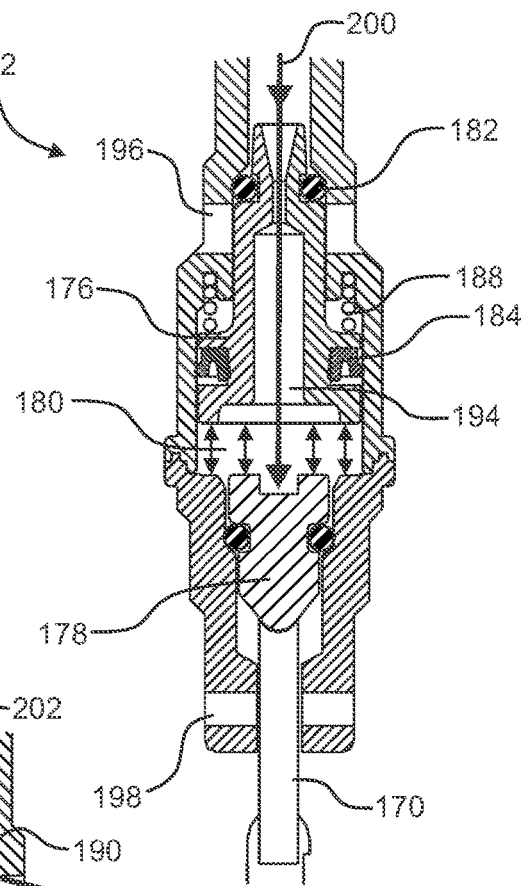
FIG. 18 is a diagrammatic cross-sectional view similar to that of FIG. 17, but wherein the valve plug is shown moved down into sealed position as a result of overfill float element reaching its shutoff position, thereby allowing the incoming fuel flow to pressurize the intermediate chamber sufficiently to force the valve piston into seal position so as to prevent the further flow of fuel into the fuel chamber.
Figure 19:
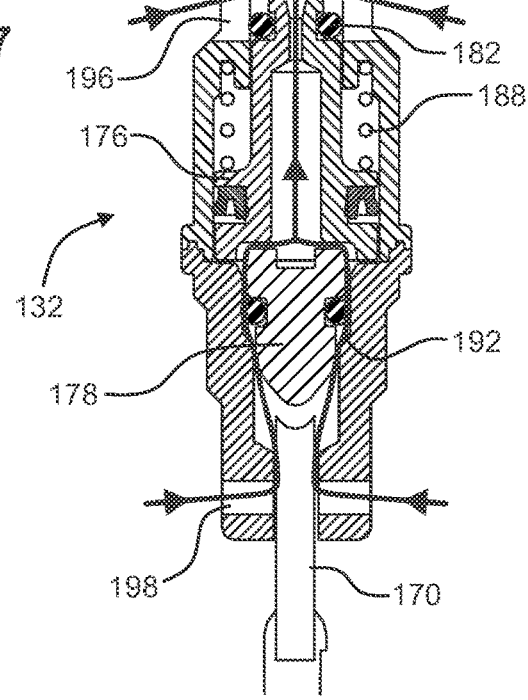
FIG. 19 is a diagrammatic cross-sectional view similar to that of FIG. 17, but wherein the overfill shutoff valve is shown in an open configuration, thereby allowing fuel to flow through the overfill shutoff valve from the fuel chamber to the primary fuel channel.
Figure 20:
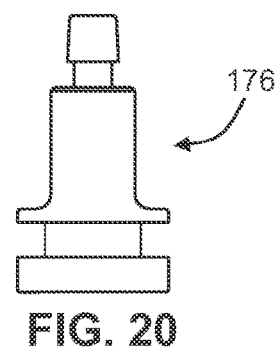
FIG. 20 is a diagrammatic side view of an example valve piston of an overfill shutoff valve.
Figure 21:
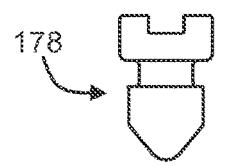
FIG. 21 is a diagrammatic side view of an example valve plug of an overfill shutoff valve.
Figure 22:
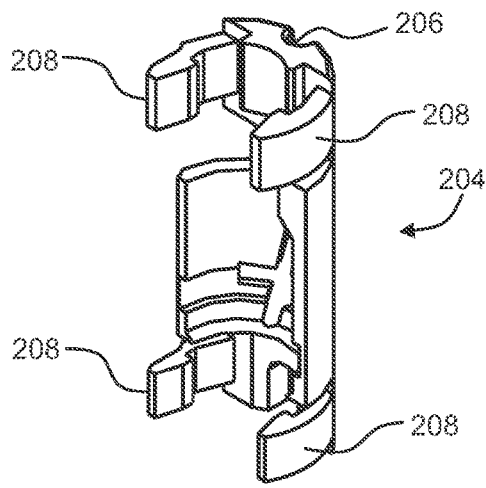
FIG. 22 is a diagrammatic perspective view of one example extension closeout element.
Figure 26:
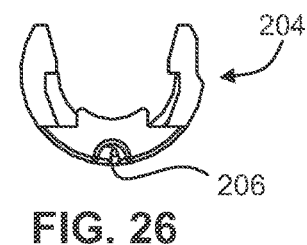
FIG. 26 is a diagrammatic top view of the example extension closeout element of FIG. 22.
Figure 23:
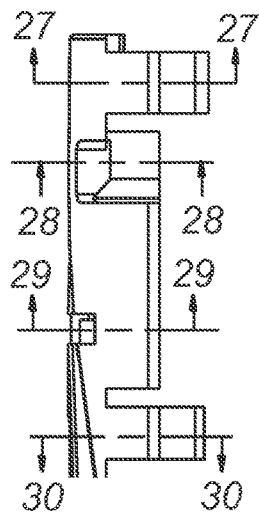
FIG. 23 is a diagrammatic side view of the example extension closeout element of FIG. 22.
Figure 24:
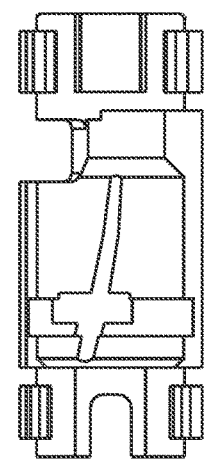
FIG. 24 is a diagrammatic front view of the example extension closeout element of FIG. 22.
Figure 25:
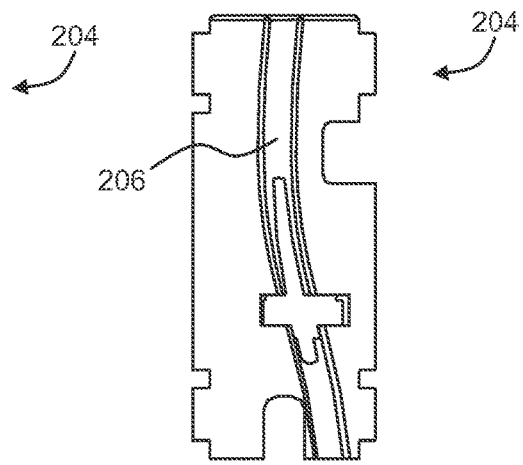
FIG. 25 is a diagrammatic rear view of the example extension closeout element of FIG. 22.
Figures 27, 28, 29, 30:
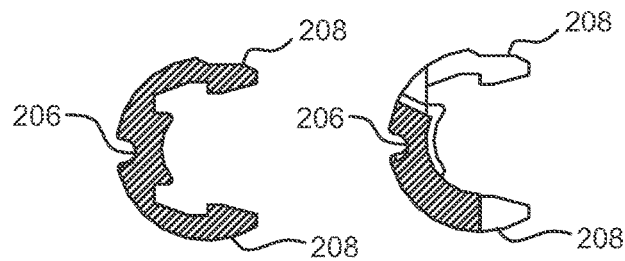
FIG. 27 is a diagrammatic cross-sectional view taken along lines 27-27 in FIG. 22.
FIG. 28 is a diagrammatic cross-sectional view taken along lines 28-28 in FIG. 22.
FIG. 29 is a diagrammatic cross-sectional view taken along lines 29-29 in FIG. 22.
FIG. 30 is a diagrammatic cross-sectional view taken along lines 30-30 in FIG. 22.
Figure 35:
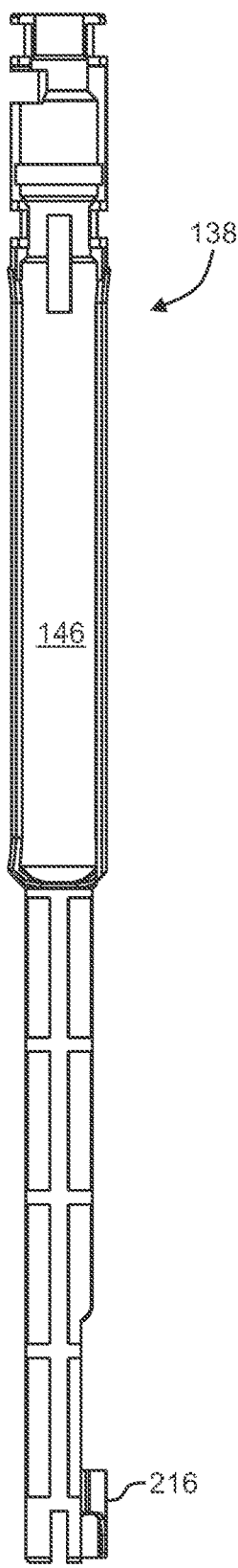
FIG. 35 is a diagrammatic front view of the extension body of FIG. 31.
Figure 36:
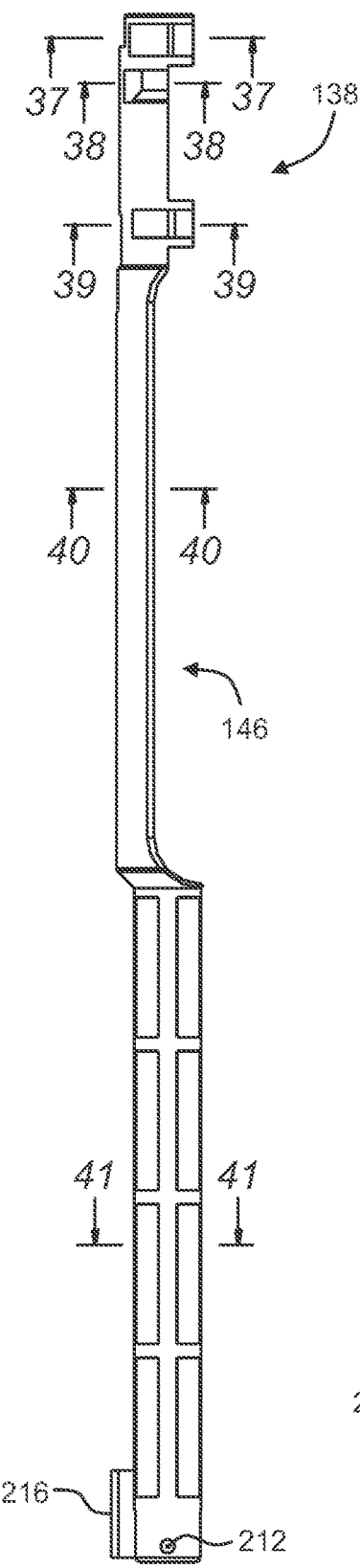
FIG. 36 is a further diagrammatic side view of the extension body of FIG. 31, taken oppositely from the viewpoint in FIG. 32.
Figure 37:
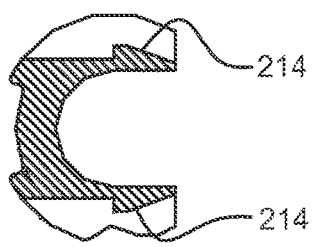
FIG. 37 is a diagrammatic cross-sectional view taken along lines 37-37 in FIG. 36.
Figure 38:
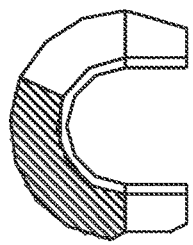
FIG. 38 is a diagrammatic cross-sectional view taken along lines 38-38 in FIG. 36.
Figure 39:
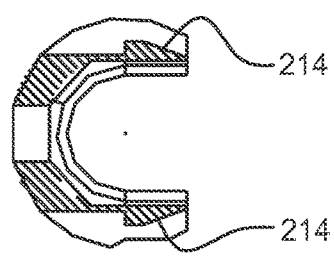
FIG. 39 is a diagrammatic cross-sectional view taken along lines 39-39 in FIG. 36.
Figure 40:
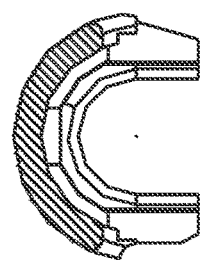
FIG. 40 is a diagrammatic cross-sectional view taken along lines 40-40 in FIG. 36.
Figure 41:
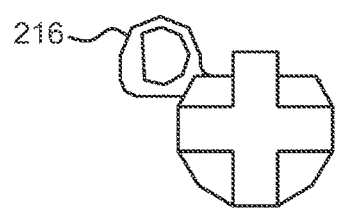
FIG. 41 is a diagrammatic cross-sectional view taken along lines 41-41 in FIG. 36.
Figure 42:
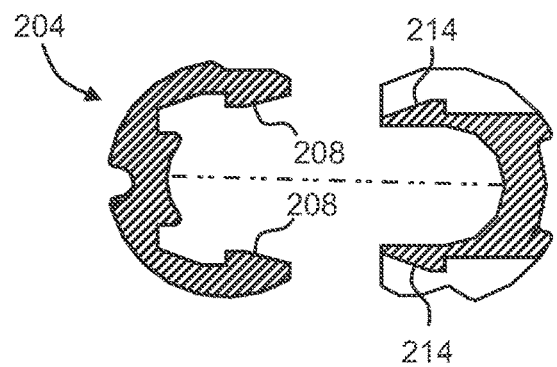
FIG. 42 is a diagrammatic cross-sectional view illustrating an example extension closeout element before being placed into mutual engagement with the extension body.
Figure 43:
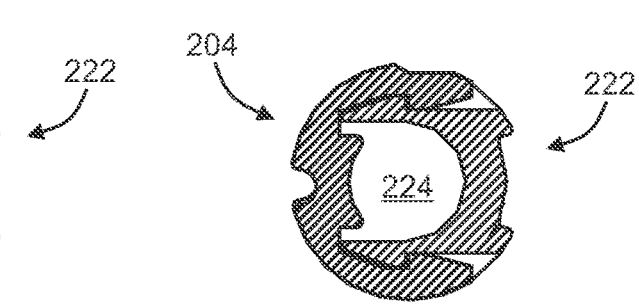
FIG. 43 is a diagrammatic cross-sectional view similar to that of FIG. 42, but wherein the extension closeout element is shown placed into mutual engagement with the extension body to define a valve securement channel therebetween.

Referring to FIGS. 2 and 18, movement of the overfill float element 128 to the shutoff position causes the overfill shutoff valve 132 to prevent fluid from flowing from the primary fuel channel 118 into the fuel storage tank. Notably, the detailed section view of the overfill shutoff valve 132 shown in FIG. 18 toward the end of a fill operation corresponds with the overfill float element 128 position shown in FIG. 2, wherein incoming fuel flow 200 prevented from moving through the overflow shutoff valve 132 and into the fuel chamber 126. In contrast, the detailed section view of the overfill shutoff valve 132 shown in FIG. 17 during an ongoing fill operation corresponds with the overfill float element 128 position shown, for example, in FIG. 3, wherein incoming fuel flow 200 is able to move through the overflow shutoff valve 132 and into the fuel chamber 126. Finally, FIG. 19 illustrates an overfill shutoff valve 132 in normal open operation as outgoing fuel 202 (e.g., in gaseous form) is expended from the fuel chamber 126 and into a fuel-using device (not shown). In these respects, an ordinary practitioner in the relevant field can appreciate that the OPD 106 aspect of the presently-disclosed tank valve system 100 may be constructed and operated similarly to conventional overfill prevention devices, such as the overfill prevention devices disclosed, in relevant part, in US Pub. No. 2008/0078467 and U.S. Pat. No. 8,550,111.

Movement of the gauge float element 134 from the uppermost position (see, for example, FIG. 3) toward the lowermost position (see, for example, FIG. 1) causes the gauge actuation portion 142 to move from the bottom position (see, for example, in FIG. 12) toward the top position (see, for example, in FIG. 11). The magnetic communication between the gauge actuation portion 142 and the fuel level indicator 110 is configured such that transport of the gauge actuation portion 142 toward the top position causes the fuel level indicator 110 to display an increasingly lower fuel indication, and transport of the gauge actuation portion 142 toward the bottom position causes the fuel level indicator 110 to display an increasingly higher fuel indication.

Referring to FIGS. 11 and 12, the gauge actuation portion 142 and fuel level indicator 110 may have mutually magnetically attractive elements to facilitate the aforementioned magnetic communication. For example, the gauge actuation portion 142 may have a shuttle magnet 172 affixed thereto, and the fuel level indicator may have a corresponding indicator magnet 226 therein.

Referring to FIG. 1, in particular preferred implementations of a tank valve system 100, the extension body 138 may be removably attachable to the overfill protection valve body 130. By way of example, referring to FIGS. 22, 31, 42 and 43, the gauge drive apparatus 108 may include an extension closeout element 204, and the removable attachability may be by way of mutual engagement between the extension closeout element 204 and a valve securement portion 222 of the extension body 138. Moreover, the mutual engagement may be by way of a snap-fit, for example between closeout fastener portions 208 and fastener engagement portions 214. The mutual engagement preferably results in the extension closeout element 204 and the extension body 138 collectively defining a valve securement channel 224, and circumferentially enveloping at least a segment of the overfill protection valve body 130.

Referring to FIG. 1, certain preferred implementations of a tank valve system 100 include a dip tube 152 configured to extend from the main valve body 104 into the fuel chamber 126. Referring to FIGS. 1 and 25-28, in such implementations, the extension closeout element 204 may include a dip tube relief channel 206 configured to retainingly receive a portion of the dip tube 152 therein. This approach helps the combined extension body 138 and extension closeout element 204 pass through a narrower neck 148 of the tank 102, by minimizing any lateral interference that might otherwise be caused by an unrelieved dip tube.

Figure 4:
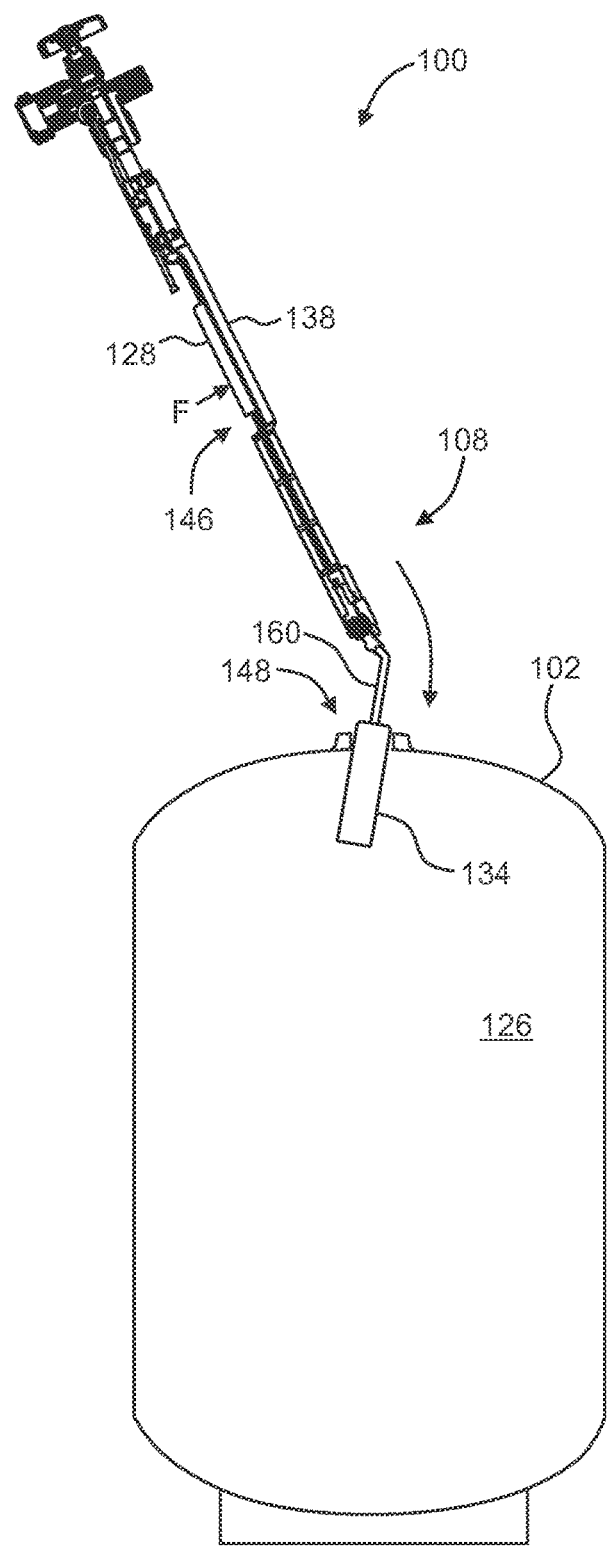
FIG. 4 is a diagrammatic partial cross-sectional view of one example tank valve system, wherein the overfill float element is shown having been transported into received engagement within the float relief bay, thereby allowing respective portions of the tank valve system to be passed through the neck of a corresponding fuel storage tank.
Figure 5:
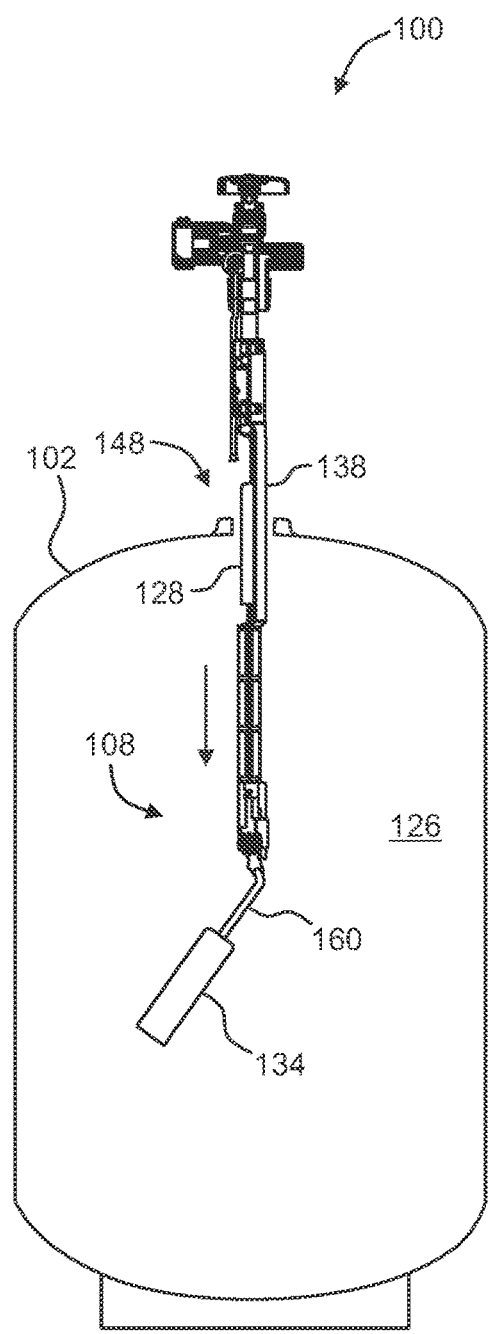
FIG. 5 is a diagrammatic partial cross-sectional view similar to that of FIG. 4, but wherein the respective portions of the tank valve system are shown in the process of being passed through the neck of the fuel storage tank with the overfill float element maintained in received engagement with the float relief bay.

Referring to FIGS. 1, 31 and 32, in particular preferred implementations of the tank valve system 100, the extension body 138 includes a float relief bay 146 which is open laterally of the extension axis 140. Referring to FIGS. 4 and 5, in such implementations, the overfill float element 128 may be configured to be transported into received engagement with the float relief bay 146. Moreover, the overfill float element 128 may be resiliently biased in a direction away from the received engagement with the float relief bay 146, and back toward a release position (such as the release position shown in FIG. 1). This resilient bias may be configured to be overcome by a human user applying a manual force (F). For example, a user (e.g., installer) of the system 100 may press (e.g., with his/her hand) the overfill float element 128 into the float relief bay 146 and maintain it in that location while inserting the relevant portions of the system 100 into the fuel chamber 126 through the neck 148. Once inside the fuel chamber 126, the overfill float element 128 may move itself back to a release position. Relatedly, the system 100 may be configured to automatically force the overfill float element 128 into the float relief bay 146 when the system 100 is being pulled out of the fuel chamber through the neck 148. The overfill float element 128 may be elongated along an overfill float axis 242, and when the overfill float element 128 is in the received engagement, the overfill float axis 242 may be configured to be parallel with the extension axis 140.

Referring to FIGS. 1 and 2, in certain implementations of the tank valve system 100, the gauge drive apparatus 108 may include a rack and pinion mechanism 232 by which the movement of the gauge float element 134 causes the movement of the shuttle element 136. In such implementations, the extension body 138 may include a rack guide portion 216, and the rack and pinion mechanism 232 may include a gear 162 (e.g., circular gear) and a rack element 164. The rack element 164 may be attached to the shuttle element 136 and slidably retained by the rack guide portion 216, and the gear 162 may be attached to the gauge float element 134 by way of a gauge float arm 160.

Figure 6:
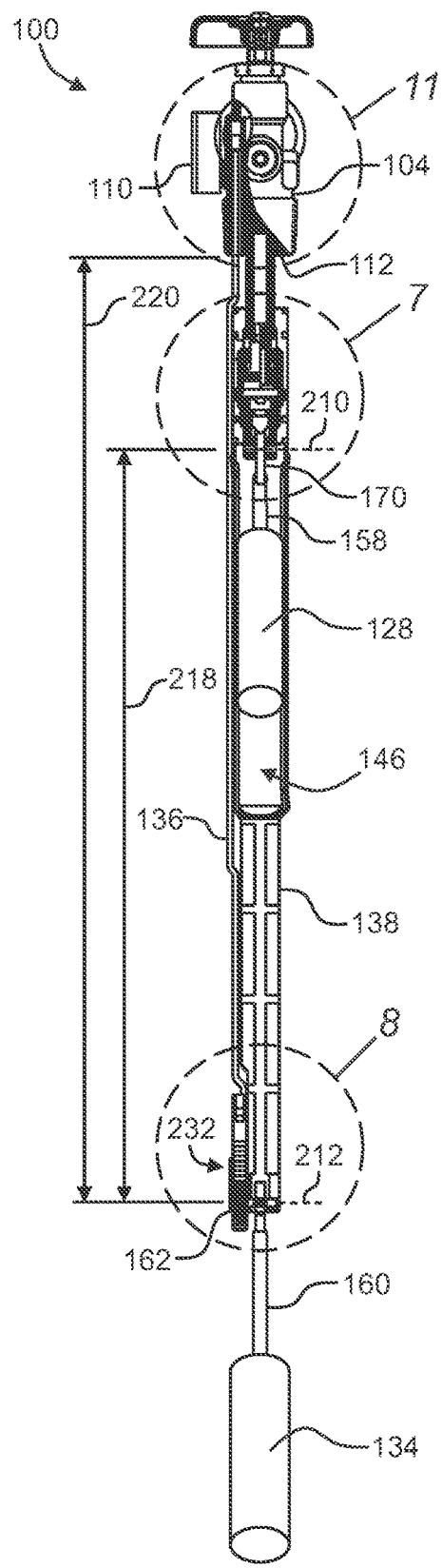
FIG. 6 is a diagrammatic partial cross-sectional view of one example tank valve system, wherein the viewing angle is orthogonal to that of FIG. 1.
Figure 7:
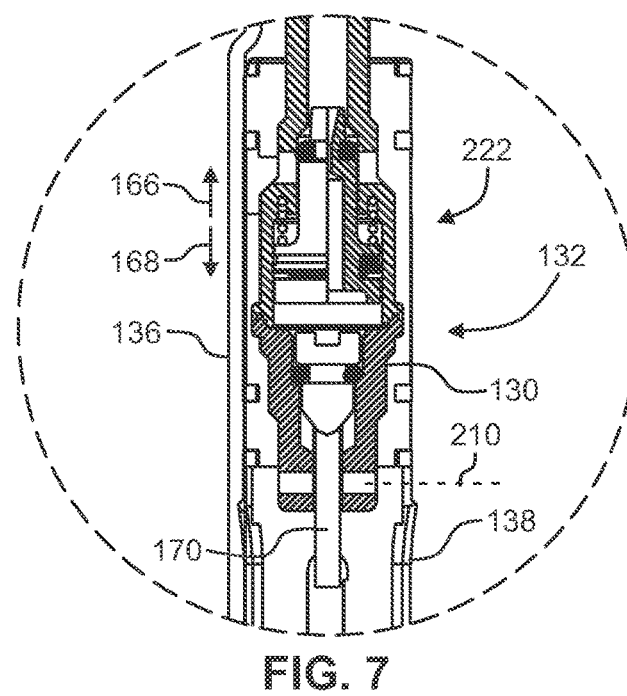
FIG. 7 is a magnified view of detail 7 in FIG. 6.
Figure 8:
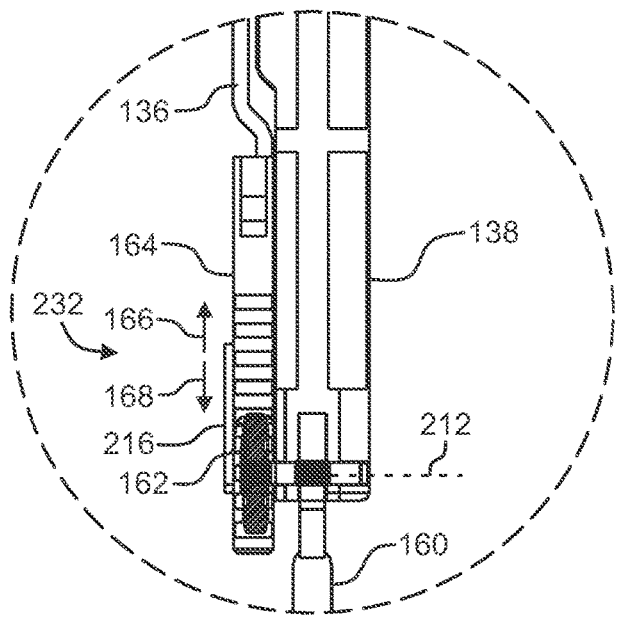
FIG. 8 is a magnified view of detail 8 in FIG. 6.

Referring to FIG. 6, in particular implementations of a tank valve system 100, the gauge float element 134 may be pivotably associated with the extension body 138 about a drive pivot axis 212. The overfill float element 128 may be pivotably associated with the overfill protection valve body 130 about an overfill protection pivot axis 210. In particular such implementations, the drive pivot axis 212 may be located at a distance 218 of at least 200 millimeters from the overfill protection pivot axis 210. Alternatively, or in addition, the drive pivot axis 212 may be located at a distance 220 of at least 300 millimeters from the proximal end 112.

Referring to FIGS. 1-3, in certain preferred implementations of a tank valve system 100, when the main valve body 104 is connected to the neck 148 of the fuel storage tank, (a) the overfill float element 128 is configured to move away from the shutoff position only when liquid fuel level 156 within the fuel chamber 126 is below a maximum allowable fuel level 234; (b) the gauge float element 134 is configured to be buoyantly maintained in the uppermost position when liquid fuel level 156 within the fuel chamber 126 reaches or exceeds a maximum gauge influence level 236; and (c) the maximum allowable fuel level 234 is higher than the maximum gauge influence level 236. In particular such implementations of the system 100, (a) the maximum allowable fuel level 234 may correspond with the liquid fuel volumetrically occupying 80% of the fuel chamber 126; and (b) the maximum gauge influence level 236 may correspond with the liquid fuel volumetrically occupying 60% of the fuel chamber 126.

The following listing matches certain terminology used within this disclosure with corresponding reference numbers used in the non-limiting embodiments illustrated in the several figures.

- 100 tank valve system
- 102 fuel storage tank
- 104 main valve body
- 106 overfill protection device (OPD)
- 108 gauge drive apparatus
- 110 fuel level indicator
- 112 proximal end
- 114 tank engagement portion
- 116 handwheel
- 118 primary fuel channel
- 120 outlet connection portion (e.g., QCC connection for propane valve)
- 122 pressure relief valve
- 124 pressure relief channel
- 126 fuel chamber
- 128 overfill float element
- 130 overfill protection valve body
- 132 overfill shutoff valve
- 134 gauge float element
- 136 shuttle element (e.g., pushrod)
- 138 extension body
- 140 extension axis
- 142 gauge actuation portion
- 144 shuttle interface channel
- 146 float relief bay
- 148 neck (of tank; e.g., standard ¾" NPT)
- 150 bleed channel
- 152 dip tube
- 154 bleed port
- 156 liquid fuel level
- 158 overfill float arm
- 160 gauge float arm
- 162 gear
- 164 rack element
- 166 upward direction
- 168 downward direction
- 170 cam portion
- 172 shuttle magnet
- 174 indicator clamp element
- 176 valve piston
- 178 valve plug
- 180 intermediate chamber
- 182 first piston seal
- 184 second piston seal
- 186 plug seal
- 188 valve spring
- 190 upper valve seat
- 192 lower valve seat
- 194 axial piston bore
- 196 upper lateral port
- 198 lower lateral port
- 200 incoming fuel flow
- 202 outgoing fuel flow
- 204 extension closeout element
- 206 dip tube relief channel
- 208 closeout fastener portion
- 210 overfill protection pivot axis
- 212 drive pivot axis
- 214 fastener engagement portion
- 216 rack guide portion
- 218 distance (from drive pivot axis to overfill protection pivot axis)
- 220 distance (from drive pivot axis to overfill protection pivot axis)
- 222 valve securement portion (of extension body)
- 224 valve securement channel
- 226 indicator magnet
- 228 indicator needle
- 230 indicator face
- 232 rack and pinion mechanism
- 234 maximum allowable fill level (e.g., corresponding to 80% of chamber volume)
- 236 maximum gauge influence level (e.g., corresponding to 60% of chamber volume)
- 238 ambient environment
- 240 bottom of fuel chamber
- 242 overfill float axis
- 244 main valve
- 246 main valve seat
- 248 connection safety valve
- 250 high fuel level indication
- 252 low fuel level indication
- 254 intermediate fuel level indications While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tank valve system comprising:
a main valve body having a proximal end, a tank engagement portion, and an outlet connection portion, the main valve body being connectable to a neck of a fuel storage tank to thereby retain the proximal end in fluid communication with a fuel chamber within the fuel storage tank, the main valve body including a primary fuel channel and a shuttle interface channel,
an overfill protection device (OPD) including an overfill float element and an overfill shutoff valve, the overfill shutoff valve being housed within an overfill protection valve body, the OPD being configured to mate to the primary fuel channel to thereby position the overfill shutoff valve in fluid communication between the primary fuel channel and the fuel chamber, the overfill float element being movable between a release position and a shutoff position;
a gauge drive apparatus including a gauge float element, a shuttle element, and an extension body, the extension body being elongated along an extension axis, the gauge float element being movable with respect to the extension body between an uppermost position and a lowermost position, the shuttle element having a gauge actuation portion transportable within the shuttle interface channel between a top position and a bottom position; and
a fuel level indicator configured to indicate a high fuel level, a low fuel level, and intermediate fuel levels therebetween, the fuel level indicator being affixable to the main valve body and configured to magnetically communicate with the gauge actuation portion;
wherein
(a) the OPD and the gauge drive apparatus are configured to be within the fuel chamber when the main valve body is connected to the fuel storage tank;
(b) movement of the overfill float element to the shutoff position causes the overfill shutoff valve to prevent fluid from flowing from the primary fuel channel into the fuel storage tank,
(c) movement of the gauge float element from the uppermost position toward the lowermost position causes the gauge actuation portion to move from the bottom position toward the top position; and
(d) the extension body is attachable to the overfill protection valve body independently of the main valve body.

2. The tank valve system as defined in claim 1, wherein the magnetic communication is configured such that transport of the gauge actuation portion toward the top position causes the fuel level indicator to display an increasingly lower fuel indication.

3. The tank valve system as defined in claim 1, wherein the extension body is removably attachable to the overfill protection valve body.

4. The tank valve system as defined in claim 3, wherein
(a) the gauge drive apparatus includes an extension closeout element; and
(b) the removable attachability is by way of mutual engagement between the extension closeout element and the extension body.

5. The tank valve system as defined in claim 4, wherein the mutual engagement is by way of a snap-fit.

6. The tank valve system as defined in claim 4, wherein the mutual engagement results in the extension closeout element and the extension body collectively circumferentially enveloping at least a segment of the overfill protection valve body.

7. The tank valve system as defined in claim 4, wherein
(a) the tank valve system includes a dip tube configured to extend from the main valve body into the fuel chamber; and
(b) the extension closeout element includes a dip tube relief channel configured to retainingly receive a portion of the dip tube therein.

8. The tank valve system as defined in claim 1, wherein
(a) the extension body includes a float relief bay therewithin which is open laterally of the extension axis; and
(b) the overfill float element is configured to be transported into received engagement with the float relief bay.

9. The tank valve system as defined in claim 8, wherein
(a) the overfill float element is resiliently biased away from the received engagement toward the release position; and
(b) the resilient bias is configured to be overcome by a human user applying manual force.

10. The tank valve system as defined in claim 8, wherein
(a) the overfill float element is elongated along an overfill float axis; and
(b) when the overfill float element is in the received engagement, the overfill float axis is parallel with the extension axis.

11. The tank valve system as defined in claim 1, wherein the overfill float element and the gauge float element are configured to be buoyant in a liquid fuel.

12. The tank valve system as defined in claim 1, wherein the gauge drive apparatus includes a rack and pinion mechanism by which the movement of the gauge float element causes the movement of the shuttle element.

13. The tank valve system as defined in claim 12, wherein
(a) the extension body includes a rack guide portion; and
(b) the rack and pinion mechanism includes a gear and a rack element, the rack element being attached to the shuttle element and slidably retained by the rack guide portion, the gear being attached to the gauge float element by way of a gauge float arm.

14. The tank valve system as defined in claim 1, wherein
(a) the gauge float element is pivotably associated with the extension body about a drive pivot axis,
(b) the overfill float element is pivotably associated with the overfill protection valve body about an overfill protection pivot axis, and
(c) the drive pivot axis is located at least 200 millimeters from the overfill protection pivot axis.

15. The tank valve system as defined in claim 14, wherein the drive pivot axis is located at least 300 millimeters from the proximal end.

16. The tank valve system as defined in claim 1, wherein when the main valve body is connected to the neck of the fuel storage tank,
(a) the overfill float element is configured to move away from the shutoff position only when liquid fuel level within the fuel chamber is below a maximum allowable fuel level;
(b) the gauge float element is configured to be buoyantly maintained in the uppermost position when liquid fuel level within the fuel chamber reaches or exceeds a maximum gauge influence level; and
(c) the maximum allowable fuel level is higher than the maximum gauge influence level.

17. The tank valve system as defined in claim 16, wherein
(a) the maximum allowable fuel level corresponds with the liquid fuel volumetrically occupying 80% of the fuel chamber; and
(b) the maximum gauge influence level corresponds with the liquid fuel volumetrically occupying 60% of the fuel chamber.

18. The tank valve system as defined in claim 1, wherein the neck is configured in accordance with ¾-inch NPT standard.

19. The tank valve system as defined in claim 1, wherein the neck has an inner diameter of 1.05 inches.

20. The tank valve system as defined in claim 1, wherein the fuel storage tank is a 30-pound propane tank.

21. The tank valve system as defined in claim 1, further comprising the fuel storage tank.

22. The tank valve system as defined in claim 1, wherein the attachment of the extension body to the overfill protection device aligns the extension axis with the primary fuel channel.

23. A tank valve system comprising:
- a main valve body having a proximal end, a tank engagement portion, and an outlet connection portion, the main valve body being connectable to a neck of a fuel storage tank to thereby retain the proximal end in fluid communication with a fuel chamber within the fuel storage tank, the main valve body including a primary fuel channel and a shuttle interface channel,
- an overfill protection device (OPD) including an overfill float element and an overfill shutoff valve, the overfill shutoff valve being housed within an overfill protection valve body, the OPD being configured to mate to the primary fuel channel to thereby position the overfill shutoff valve in fluid communication between the primary fuel channel and the fuel chamber, the overfill float element being movable between a release position and a shutoff position;
- a gauge drive apparatus including a gauge float element, a shuttle element, and an extension body, the extension body being elongated along an extension axis, the gauge float element being movable with respect to the extension body between an uppermost position and a lowermost position, the shuttle element having a gauge actuation portion transportable within the shuttle interface channel between a top position and a bottom position; and
- a fuel level indicator configured to indicate a high fuel level, a low fuel level, and intermediate fuel levels therebetween, the fuel level indicator being affixable to the main valve body and configured to magnetically communicate with the gauge actuation portion;

wherein
(a) the OPD and the gauge drive apparatus are configured to be within the fuel chamber when the main valve body is connected to the fuel storage tank;
(b) movement of the overfill float element to the shutoff position causes the overfill shutoff valve to prevent fluid from flowing from the primary fuel channel into the fuel storage tank;
(c) movement of the gauge float element from the uppermost position toward the lowermost position causes the gauge actuation portion to move from the bottom position toward the top position; and
(d) the extension body is attached to the overfill protection valve body independently of the main valve body.

* * * * *